(12) United States Patent
Turner et al.

(10) Patent No.: US 11,054,280 B2
(45) Date of Patent: Jul. 6, 2021

(54) DISPLAYING WEATHER-BASED FLIGHT INFORMATION IN VERTICAL PROFILE

(71) Applicant: INTERNATIONAL BUSINESS MACHINES CORPORATION, Armonk, NY (US)

(72) Inventors: James Martin Turner, Derry, NY (US); James W. Flynn, Medford, MA (US); Pamela Margaret Erickson, Pelham, NH (US); Ravneet Kaur Marwaha, Cambridge, MA (US); Linda Marie Camillo, Madison, WI (US); Glenn Howes, Nashua, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 357 days.

(21) Appl. No.: 16/206,943

(22) Filed: Nov. 30, 2018

(65) Prior Publication Data

US 2020/0173809 A1    Jun. 4, 2020

(51) Int. Cl.
*G08G 5/00* (2006.01)
*G01C 23/00* (2006.01)

(52) U.S. Cl.
CPC ......... *G01C 23/005* (2013.01); *G08G 5/0021* (2013.01); *G08G 5/0047* (2013.01); *G08G 5/0091* (2013.01)

(58) Field of Classification Search
None
See application file for complete search history.

(56) References Cited

U.S. PATENT DOCUMENTS

| | | |
|---|---|---|
| 9,171,473 B1 | 10/2015 | McNally |
| 9,649,935 B2 | 5/2017 | Bas Gago |
| 9,710,218 B2 | 7/2017 | Khatwa |
| 9,810,770 B1 | 11/2017 | Weichbrod |
| 2016/0011839 A1* | 1/2016 | Khatwa ................ G01S 13/953 345/7 |
| 2018/0268721 A1* | 9/2018 | McCullough ........ G08G 5/0021 |
| 2020/0133611 A1* | 4/2020 | Feyereisen ............. G01C 23/00 |
| 2020/0168106 A1* | 5/2020 | De Prins .............. G08G 5/0052 |

\* cited by examiner

*Primary Examiner* — James M McPherson
(74) *Attorney, Agent, or Firm* — Robert J. Shatto, Esq.; Wayne F. Reinke, Esq.; Heslin Rothenberg Farley & Mesiti P.C.

(57) ABSTRACT

Displaying weather-based information for a flight path is disclosed. A data processing system receives a flight path and retrieves weather-related raster-based forecast data along the flight path. The data processing system then generates a vertical profile for the flight path for all altitudes along the flight path and all flight times along the flight path. The weather-related raster-based forecast data is then converted by the system into polygonal bands that are superimposed by the data processing system onto the vertical profile, resulting in a modified vertical profile. The modified vertical profile is then displayed by the data processing system with a selector in a graphical user interface (GUI) for selecting a flight time of the flight times along the flight path.

20 Claims, 7 Drawing Sheets

DISPLAYING WEATHER-BASED FLIGHT INFORMATION IN VERTICAL PROFILE

BACKGROUND

When planning cross-country flights, pilots need to know the weather conditions along the route (especially those that could adversely affect the flight). Most, if not all, weather products, such as those created by national weather agencies, and private entities, are "top-down" views. However, a pilot needs to know not only if their flight will intersect a weather feature in horizontal space, but if they will be flying at an altitude where they will actually encounter the weather. Conventionally, for a pilot to determine what altitude to request in light of forecasted weather-related conditions, the pilot would have to look through top-down raster images of weather over land at each altitude until getting to one without the weather, taking time and attention.

Weather products actually live in four dimensions. A given weather condition may be observed or forecast at a given latitude and longitude (X and Y), for a given range of altitudes (Z) during a given range of times (T). For example, a pilot report of moderate turbulence have occurred at a certain latitude and longitude at FL310 at 0432Z. Or turbulence may be forecast for a polygonal area between FL180 and 330 today between 0300Z and 0600Z. This complexity makes it difficult for pilots to visualize the actual weather conditions that they need to be concerned with.

In U.S. Pat. No. 9,659,935, disclosed is a method of displaying weather data for a flight plan by forecasting weather situation in a region for a future instant of time at which the aircraft reaches a point in flight path that allows a pilot to plan out variations in route or altitude to avoid hazardous weather. However, for example, no mention is made of raster data or how to convert it into vertical features.

In U.S. Pat. No. 9,171,473, disclosed is a method of displaying weather data for a flight plan using polygonal bands generated from raster data that allows a pilot to plan out variations in route or altitude to avoid hazardous weather. The patent also discloses a method of estimating time at which the plane arrives at every geospatial coordinate in flight path and generating a plurality of weather bands based on altitude ranges. However, absent is, for example, how to calculate polygons at altitudes from source data. The focus is more about automating the rerouting of a flight based on weather.

In U.S. Pat. No. 9,710,218, disclosed is a method of displaying plurality of weather bands on a GUI, wherein the GUI consists of two display areas, a first display area displaying a top-down view of the flight plan overlaid on a map and a second display area displaying a vertical slice view of the weather data at each altitude based on the time that the plane arrives at that point. However, the focus is on a "hazard band," above which there is no bad weather, nor is there disclosure as to generating the information from data sources.

In U.S. Pat. No. 9,810,770, disclosed is a method of selectively displaying an image representative of a weather condition in relation to an aircraft path by utilizing altitude and range of the weather condition to generate a vertical profile associated with the weather. However, lacking are details regarding converting raster-based data to aircraft as polygons.

SUMMARY

Shortcomings of the prior art are overcome and additional advantages are provided through the provision, in one aspect, of a computer-implemented method of displaying weather-based information for a flight path. The method includes: receiving, by a data processing system, a flight path; retrieving, by the data processing system, weather-related raster-based forecast data along the flight path; generating, by the data processing system, a vertical profile for the flight path for all altitudes along the flight path and all flight times along the flight path; converting the weather-related raster-based forecast data into polygonal bands; superimposing, by the data processing system, the polygonal bands onto the vertical profile, resulting in a modified vertical profile; and displaying, by the data processing system, the modified vertical profile with a selector in a graphical user interface (GUI) for selecting a flight time of the flight times along the flight path.

In one embodiment building on the first aspect, the flight path may have, for example, a set of geospatial coordinates for each flight time, and the generating includes: building a list of unique X-Y-time entries that correspond to the flight plan; fetching raster tiles as needed from a set of raster tiles for the flight plan based on the list of X-Y-time entries, each raster tile including weather data for a geographical region at a corresponding arrival time; generating weather bands based on altitude ranges and the fetched raster tiles; and displaying the weather bands in the GUI.

In another embodiment building on the first aspect, the computer-implemented method may further include, for example, a first display area displaying a top-down view of the flight plan overlaid on a map, the top-down view showing the flight plan and weather data that corresponds to the altitude and time that the plane will be at that point; and a second display area having a first axis that correspond to time and a second axis that corresponds to altitude, the second display area displaying a vertical slice view of the weather data at each altitude based on the time that the plane will arrive at that point.

In still another embodiment building on the first aspect, the displaying in the computer-implemented method of the first aspect may include, for example, displaying, by the data processing system, the modified vertical profile with the selector in a first portion of the GUI. In one example, the computer-implemented method may further include, for example, displaying, by the data processing system, a raster map of the geospatial coordinates with the weather-related raster-based forecast data, resulting in a raster view, in a second portion of the GUI, wherein the raster view is at an altitude and time corresponding to that currently in the first portion of the GUI.

In yet another embodiment building on the first aspect, the weather-related raster-based forecast data in the computer-implemented method of the first aspect may include, for example, RPM turbulence.

Corresponding system and program product aspects are also provided.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
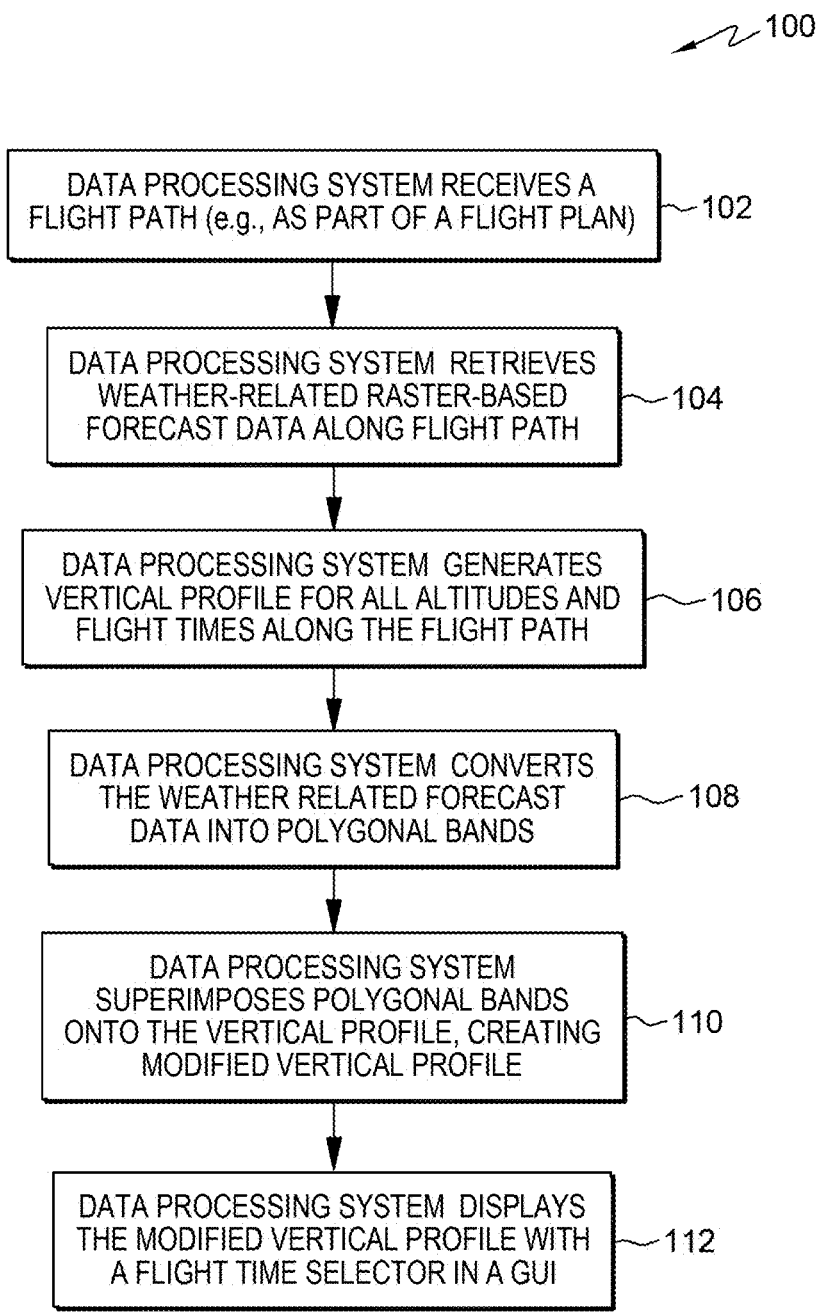
FIG. 1 is a flow diagram for one example of displaying weather-based flight information for a flight path, in accordance with one or more aspects of the present disclosure.

One or more aspects of this disclosure relate, in general, to displaying of weather-based flight information. More particularly, one or more aspects of this disclosure relate to displaying weather-based flight information in a vertical profile.

A solution to the problems noted above is to present a "Profile View" of the flight, displaying a cross-section showing only the weather that will directly intersect the flight plan. This allows the pilot or other user to see a vertical slice of the weather environment to determine if weather systems will be a factor based on their altitude. At least one limited version of this type of capability is known, however, among other features, it specifically does not incorporate forecasted turbulence.

Turbulence products are particularly difficult to incorporate into a vertical profile because they are produced as a series of raster images at varying altitudes (9,000 ft, 10,000 ft, etc.) Unlike other forecast products that consist of polygons and altitude ranges, turbulence forecasts can be thought of as horizontal slices through the atmosphere. They also are issued with very short valid periods (typically 1 hour increments), so different turbulence forecasts may be in effect at different points during a long flight. These factors make this type of data very difficult to display in a vertical profile.

To solve this problem, disclosed herein is a method of creating polygonal bands out of the raster data for turbulence and other weather-related raster-based forecast data. As a result, the pilot or other user can see their flight in profile, and see if they will intersect raster-depicted weather features without having to switch back and forth between a number of different altitude products.

Disclosed herein, a flight path is represented as a line running from left to right, with planned altitudes as the height of the line. Over that, displayed is the observed or forecast weather that the flight will directly intersect at the time that the flight is at that point, as well as the weather above and below. This allows the user to plan out variations in route or altitude to avoid hazardous weather.

Disclosed herein is a unique capability, because it translates top-down slices of weather into a layered view that allows the user to visualize the entire atmosphere around the aircraft. It also removes weather that will not affect them because it is forecast for a time when they are not there.

As used herein, the term "vertical profile" refers to a display of weather-related raster-based forecast data that includes all relevant altitudes of a flight path and all relevant times for the flight path (i.e., arrival times at various points in the flight path).

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

In one embodiment, the flight path is part of a flight plan, usually submitted by the pilot or other user. The flight plan may be created in a number of ways, for example, a preexisting flight plan can be used for a route flown previously or as a base with changes, additions or deletions. In another example, the system may guide a pilot through creating a flight plan. For example, the system could prompt the pilot with a series of information requests, for example, departure and destination airports, choosing a route, etc.

FIG. 1 is a flow diagram 100 for one example of displaying weather-based flight information for a flight path, in accordance with one or more aspects of the present disclosure. Initially, a data processing system receives 102 a flight path from a user. In one example, the flight path is part of a flight plan. In some embodiments, the data processing system automatically retrieves the flight path (and/or the flight plan) from another computer system or database. For example, the data processing system may be communicatively coupled to an on-board computer system (i.e., a computer system on the plane, such as an autopilot system), and the data processing system may automatically retrieve flight information from the on-board computer. In this way, flight information already loaded into another on-board system need not be manually entered into the disclosed data processing system. Additionally, by syncing the computer systems on the plane, changes to one system (e.g., changes to the autopilot settings) can be automatically propagated to the data processing system, enabling generation and display of updated weather-based flight information without the pilot or other user having to manually enter changes into each computer system. The system then retrieves 104 weather-related raster-based forecast data along the flight path. The system then generates 106 a vertical profile for all altitudes and flight times along the flight path. The system then converts 108 the weather-related forecast data into polygonal bands. The system then superimposes 110 the polygonal bands onto the vertical profile, creating a modified vertical profile. The system then displays 112 the modified vertical profile with a flight time selector in a graphical user interface.

Figure 2:
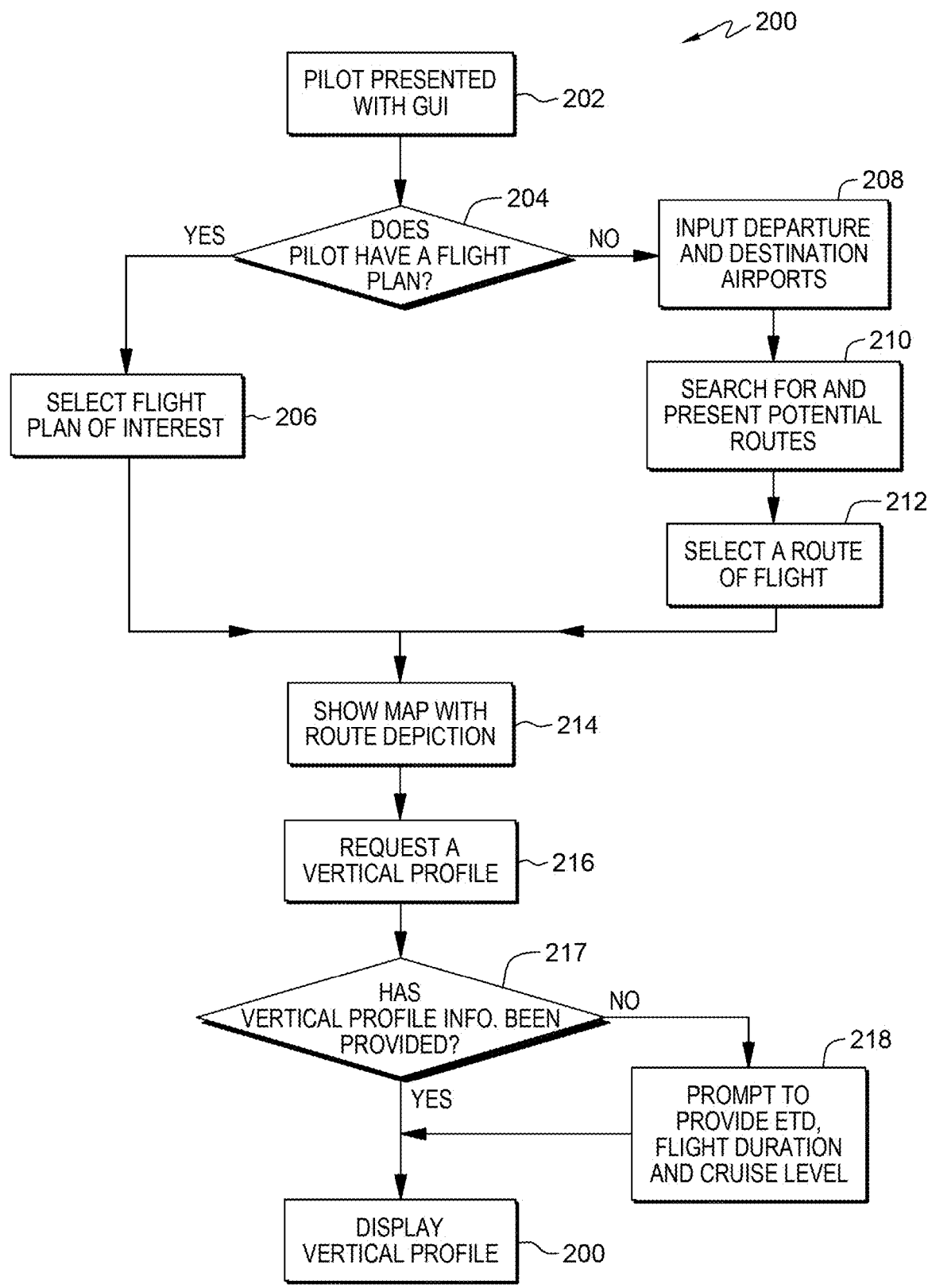
FIG. 2 is a flow diagram for one example of generating a flight plan, in accordance with one or more aspects of the present disclosure.

FIG. 2 is a flow diagram 200 for one example of generating a flight plan, in accordance with one or more aspects of the present disclosure. A pilot or other user or other user is presented 202 with a graphical user interface (GUI) for generating a flight plan. An inquiry 204 is made as to whether the pilot has a flight plan. If the pilot does have a flight plan, a "yes" answer to inquiry 204, the pilot selects 206 the flight plan. If the pilot has no flight plan, a "no" answer to inquiry 204, the pilot is prompted for information needed. For example, the pilot may be asked 208 for departure and destination airports. With that information, the system can search for and present 210 potential routes to the pilot, after which the pilot selects 212 a route from the search results presented. Once the system has the provided or chosen flight plan, a map with the route depiction is shown 214 to the pilot via the GUI. The pilot may then request 216 a vertical profile from the system. In response to the request, an inquiry 217 is made as to whether the necessary information to generate a vertical profile has been provided or is otherwise available (e.g., previously provided). If the profile information has been provided, a "yes" answer to inquiry 217, then the system displays 220 the virtual profile for the pilot. If the vertical profile information has not already been provided, a "no" answer to inquiry 217, the system prompts 218 the pilot to provide an estimated time of departure (ETD), a flight duration and a cruising level, after which the system generated and displays 220 the vertical profile.

Figure 3:
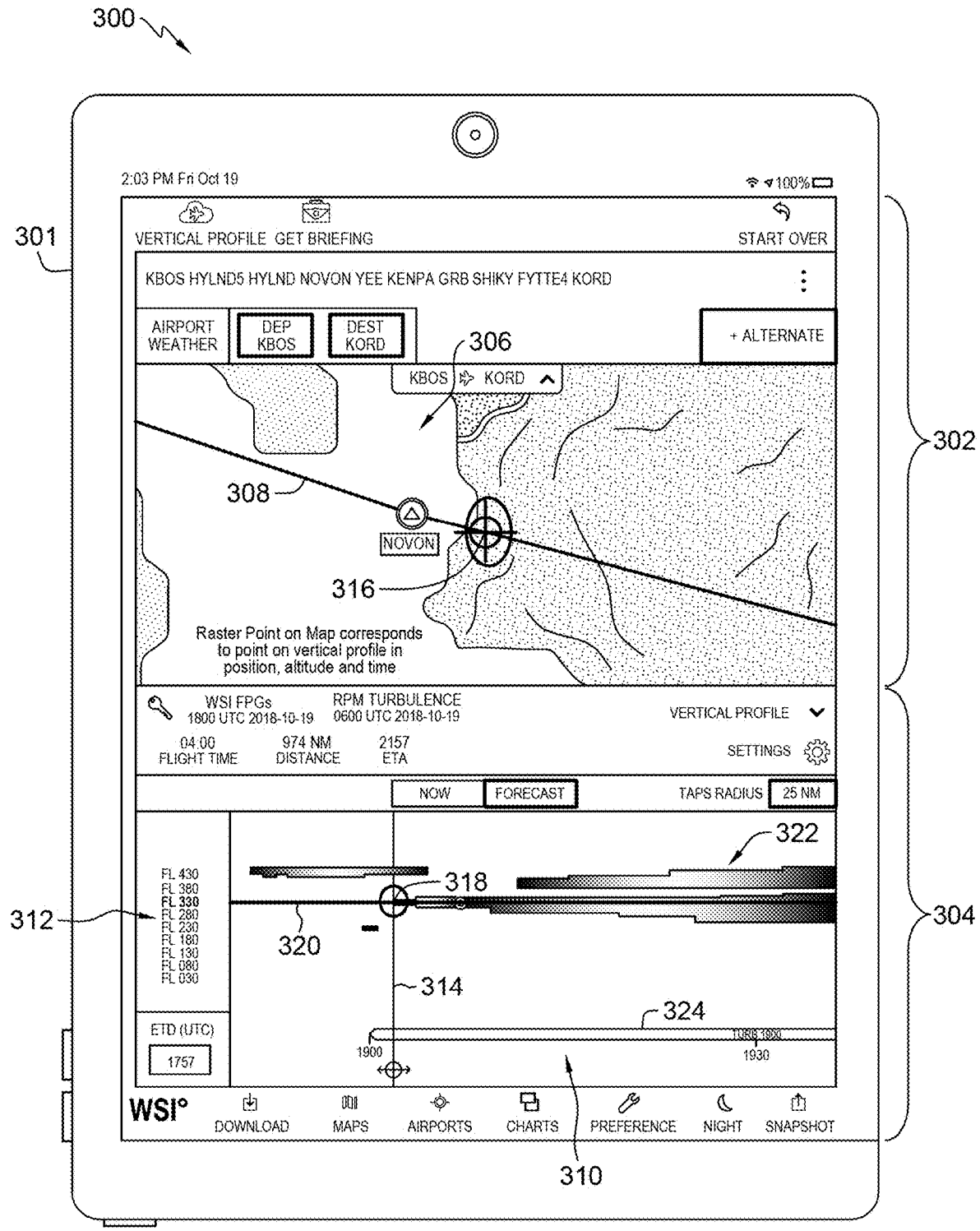
FIG. 3 depicts one example of a Graphical User interface (GUI) on a display (e.g., monitor, tablet, smart phone, etc.), the GUI including, for example an upper portion and a lower portion, in accordance with one or more aspects of the present disclosure.

FIG. 3 depicts one example of a Graphical User interface (GUI) 300 on a display 301 (e.g., monitor, tablet, smart phone, etc.), the GUI including, for example an upper portion 302 and a lower portion 304, in accordance with one or more aspects of the present disclosure. The upper portion shows, for example, a two-dimensional top-down view of a map with rendered altitude-based raster forecast data 306 superimposed on the map, for example, RPM Turbulence (due to weather), with a flight path 308 superimposed. The lower portion shows, for example, a vertical profile of the map along the flight path at all relevant altitudes, and all estimated arrival times. Essentially, the lower portion is an X-Y plot of time 310 along the X-axis and altitude 312 along the Y-axis. A selector (also known as a "scrubber") 314, is used to move in either direction (left or right) along the time axis. The act of moving the selector through time is known as "scrubbing." A raster point 316 on the map corresponds to a point 318 in the lower portion, the point showing, a position on a flight path 320, altitude and time. The forecasted raster data corresponds to polygonal shapes 322 in the lower portion. In one embodiment, as shown here, the polygonal shapes are made up of a base shape, for example, rectangles grouped with other like ones, here, colors corresponding to severity of the weather shown by the rendered raster data. The forecasted data comes in spans of time, for example, time span 324. When the raster point in question crosses the boundary of a forecast period, the raster tile for the next forecast period must be used. This effectively leads to blended tiles using multiple forecast periods. When the next raster pixel is in a new forecast validity, the appropriate new tile is used even if the last pixel was in the same geographic tile area. To be correct, the value retrieved needs to be accurate to position, altitude and forecast time. In this case, a point at the crosshair is the transition between forecast periods, and a new tile must be fetched for points to the left of it in order to use the correct forecast periods for when the plane will be over that point.

Weather products actually live in four dimensions. A given weather condition may be observed or forecast at a given latitude and longitude (X and Y), for a given range of altitudes (Z) during a given range of times (T). For example, a pilot or other user report of moderate turbulence has occurred at a certain latitude and longitude at FL310 at 0432Z. In another example, turbulence may be forecast for a polygonal area between FL180 and 330 today between 0300Z and 0600Z. This complexity makes it difficult for pilots to visualize the actual weather conditions that they need to be concerned with.

The solution provided herein is to present a "Profile (or Vertical) View" of the flight, displaying a cross-section showing only the weather that will directly intersect the flight plan. This allows the pilot or other user to see a vertical slice of the weather environment, and to determine if weather systems will be a factor based on their altitude.

Turbulence products are particularly difficult to incorporate into a vertical profile because they are produced as a series of raster images at varying altitudes (9,000 ft, 10,000 ft, etc.) Unlike other forecast products that consist of polygons and altitude ranges, turbulence forecasts can be thought of as horizontal slices through the atmosphere. They also are issued with very short valid periods (typically 1 hour increments), so different turbulence forecasts may be in effect at different points during a long flight. These factors make this type of data very difficult to display in a vertical profile.

To solve this problem, disclosed is a method of creating polygonal bands out of the raster data. As a result, the pilot or other user can see their flight in profile, and see if they will intersect raster-depicted weather features without having to switch back and forth between a number of different altitude products.

In one embodiment, the flight plan is turned into a line running from left to right, with planned altitudes as the height of the line. Over that, the observed or forecast weather that the flight will directly intersect at the time that the flight is at that point will be displayed, as well as the weather above and below. This allows the pilot or other user to plan out variations in route or altitude to avoid hazardous weather.

What is disclosed herein is unique, because it translates top-down slices of weather into a layered view that allows the pilot or other user to visualize the entire atmosphere around the aircraft. It also removes weather that will not affect the flight because it is forecast for a time when the plane will be not there.

Appropriate image raster tiles are retrieved for each point along the flight path. The forecast raster data is available (e.g., as a service) at a variety of zoom levels. In the examples herein, a zoom level at which a single pixel of data is equivalent to 4 nm is chosen, which is the resolution limit of some available turbulence products. This zoom level results in a 16×16 grid for the entire world. Furthermore, there are 20 altitude forecasts available for each tile, and 25 hourly forecasts available for each altitude. If all the tiles for the entire world were retrieved, this would result in retrieving 128,000 tiles, which is obviously impractical, especially when the pilot or other user is using in-flight Wi-Fi, for example.

Instead, only the tiles needed to display the profile are retrieved. Starting at the departure location the question to ask is "what tile corresponds to the point I am under, and at what time am I predicted to cross this point?" In the present disclosure, a list of unique X-Y-time entries, corresponding only to the tiles that the flight crosses and only for the times they will be over that tile. Because a flight may cross a tile slowly enough to be over it during multiple valid times, at time it may be necessary to retrieve the same X-Y tile for different times. All altitudes are retrieved, so that the system can display the vertical slice, while drastically reducing the number of X-Y and time dimension tiles. For example, a cross-country trip may need to download 10-12 X-Y tiles over 1-2 forecast periods per tile, resulting in more like 100-300 tiles downloaded to generate the profile.

Once all the tiles are retrieved, the system "walks" along the flight path at, for example, 4 nm increments. At each point, the system iterates over all the altitudes and finds the equivalent raster pixel in the corresponding tiles. In one example, the color of the pixel determines the type of weather forecast, and rasters of the same color horizontally are joined to create contiguous polygons that span halfway from the altitude beneath it to halfway to the altitude above it. For example, if the flight is banding FL110, and FL100 and FL120 are also available, bands that span from FL105 to FL115 may be generated.

Once the bands have been created, the data can be displayed in a vertical slice. Using a selector or scrubber control, the pilot or other user can drag along the flight times, and see the weather features on a corresponding "top-down" view. The raster layers displayed on the top-down view are set to correspond to the altitude and time that the plane will be at that point.

Certain embodiments herein may offer various technical computing advantages involving computing advantages to address problems arising in the realm of computer networks; particularly, computer networks operating to provide weather-based information for a flight path. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can generate a vertical profile for a flight path for all altitudes along the flight path and all flight times along the flight path (i.e., arrival times at given points along flight path). Embodiments herein can convert weather-related raster-based forecast data, for example, RPM turbulence, into polygonal bands and superimpose the polygonal bands onto the vertical profile, resulting in a modified vertical profile. Embodiments herein can display the modified vertical profile with a selector in a GUI for selecting a flight time of the flight times along the flight path. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Where voice-based input from a user is enabled (e.g., a pilot or other user using voice to provide flight plan information), Natural Language Understanding may be used to interpret the input. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

Figure 7:
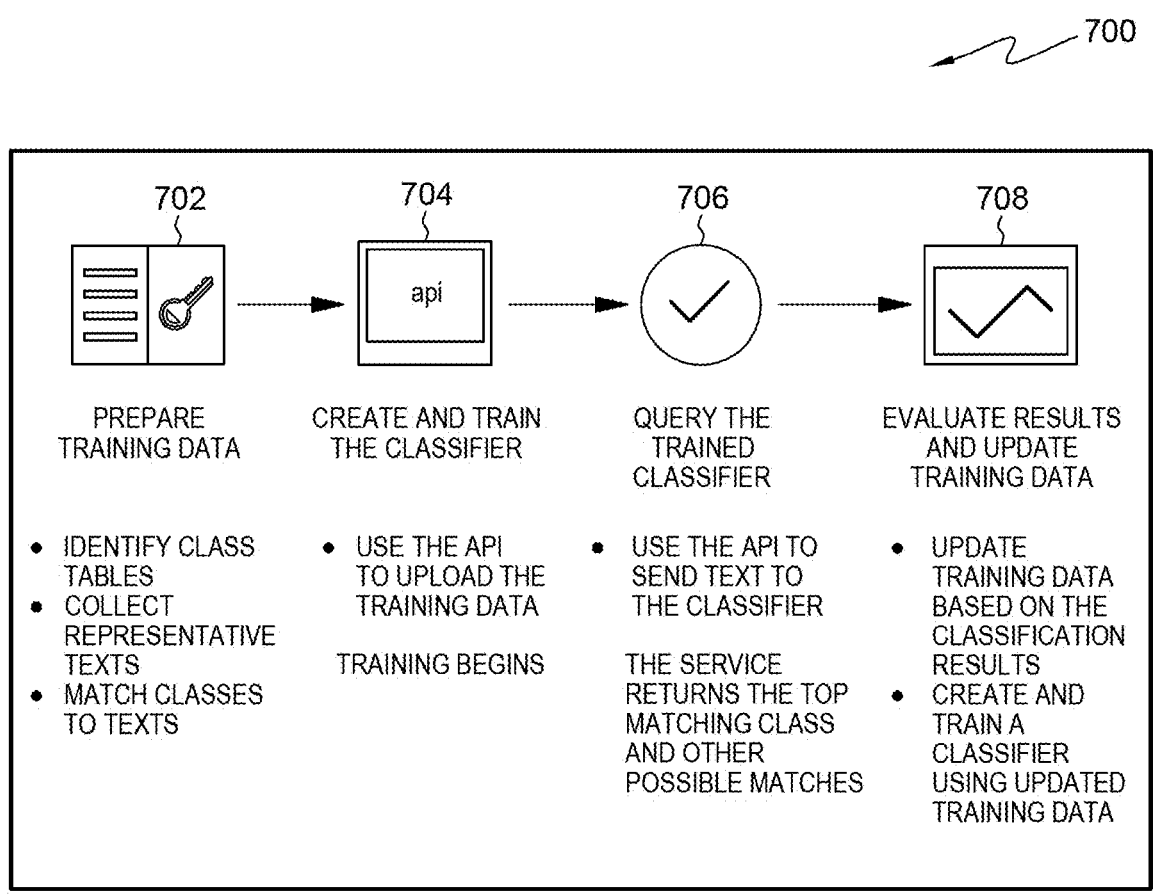
FIG. 7 is a hybrid flow diagram of one example of an overview of the basic steps for creating and using a natural language classifier service, in accordance with one or more aspects of the present disclosure.

FIG. 7 is a hybrid flow diagram 700 of one example of an overview of the basic steps for creating and using a natural language classifier service. Initially, training data for machine learning is prepared, 702, by identifying class tables, collecting representative texts and matching the classes to the representative texts. An API (Application Planning Interface) may then be used to create and train the classifier 704 by, for example, using the API to upload training data. Training may begin at this point. After training, queries can be made to the trained natural language classifier, 706. For example, the API may be used to send text to the classifier. The classifier service then returns the matching class, along with other possible matches. The results may then be evaluated and the training data updated, 708, for example, by updating the training data based on the classification results. Another classifier can then be trained using the updated training data.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Where used herein, terms in the form of "cognitive(ly) <function>" refer to the use of cognitive computing in performing the function. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

In embodiments, the system can display a vertical profile corresponding to a route of flight, flight times and desired cruise level as a panel below the map. The vertical profile provides a cross-section view of the route of flight, with all waypoints and airports, and weather intersections. In one embodiment, a scale at the bottom may depict distance. The vertical profile depicts flight plan guidance and, for example, forecast turbulence along the route of flight, at the time the pilot or other user will experience them. A selector or scrubber appears at bottom of screen, and the X-axis represents time. Instead of one time slice being depicted, the timeline stitches together all relevant forecasts for the flight duration, enabling a pilot to evaluate weather at all altitudes of interest. As the pilot moves the scrubber tool, the map updates it centering position, altitude and forecasts to correspond with the pilot's or other user's expected position on the route, enabling a relevant view of the weather and route. Available layers depict, for example, areas of potential turbulence, convection, icing, volcanic ash, dust or ozone; and output from turbulence sensors on aircraft that have recently flown through these areas. When the route is edited, the vertical profile updates to reflect changes to route. Forecast and observation data will be refreshed to provide an accurate depiction of the new route.

The system can open a settings dialog which allows a user to edit estimated time of departure duration, departure date, planned flight level, maximum flight level to display, and the radius of any in situ observations. Form and keyboard may be shown. The system updates forecasts to correspond to new flight duration. The system can display a vertical profile corresponding to route of flight, flight times and desired cruise level as a panel below the map. A magenta dashed line that stretches horizontally across the profile corresponds with the climb altitude that is selected. The flight level for the prior phase of flight is shown as a gray dashed line. The magenta Y axis label now highlights the climb altitude. The pilot's or other user's path through forecast turbulence is shown. The system can open a settings dialog which allows a user to edit estimated time of departure duration, departure date, planned flight level, maximum flight level to display, and the radius of any in situ observations. Form and keyboard may be shown. The system updates forecasts to correspond to new flight duration.

In a first aspect, disclosed above is a computer-implemented method of displaying weather-based information for a flight path. The computer-implemented method includes: receiving, by a data processing system, a flight path; retrieving, by the data processing system, weather-related raster-based forecast data along the flight path; generating, by the data processing system, a vertical profile for the flight path for all altitudes along the flight path and all flight times along the flight path; converting the weather-related raster-based forecast data into polygonal bands; superimposing, by the data processing system, the polygonal bands onto the vertical profile, resulting in a modified vertical profile; and displaying, by the data processing system, the modified vertical profile with a selector in a graphical user interface (GUI) for selecting a flight time of the flight times along the flight path.

In one example, the flight path may have, for example, a set of geospatial coordinates for each flight time, and the generating includes: building a list of unique X-Y-time entries that correspond to the flight plan; fetching raster tiles as needed from a set of raster tiles for the flight plan based on the list of X-Y-time entries, each raster tile including weather data for a geographical region at a corresponding arrival time; generating weather bands based on altitude ranges and the fetched raster tiles; and displaying the weather bands in the GUI. In one example, the computer-implemented method may further include, for example, a first display area displaying a top-down view of the flight plan overlaid on a map, the top-down view showing the flight plan and weather data that corresponds to the altitude and time that the plane will be at that point; and a second display area having a first axis that correspond to time and a second axis that corresponds to altitude, the second display area displaying a vertical slice view of the weather data at each altitude based on the time that the plane will arrive at that point.

In one example, the displaying in the computer-implemented method of the first aspect may include, for example, displaying, by the data processing system, the modified vertical profile with the selector in a first portion of the GUI. In one example, the computer-implemented method may further include, for example, displaying, by the data processing system, a raster map of the geospatial coordinates with the weather-related raster-based forecast data, resulting in a raster view, in a second portion of the GUI, wherein the raster view is at an altitude and time corresponding to that currently in the first portion of the GUI.

In one example, the modified vertical profile in the computer-implemented method of the first aspect may be based, for example, on forecast validity periods along the flight path.

In one example, the selector in the computer-implemented method of the first aspect may include, for example, a movable line perpendicular to a time axis.

In one example, the polygonal bands in the computer-implemented method of the first aspect may include, for example, a base shape grouped together by like areas.

In one example, the weather-related raster-based forecast data in the computer-implemented method of the first aspect may include, for example, RPM turbulence.

In one example, the weather-related raster-based forecast data in the computer-implemented method of the first aspect may include, for example, at least one of severe weather, radar and lightning.

In a second aspect, disclosed above is a system for displaying weather-based information for a flight path. The system includes: a storage medium readable by a processor and storing instructions executable by the processor for performing a method of displaying weather-based information for a flight path. The method includes: receiving, by a data processing system, a flight path; retrieving, by the data processing system, weather-related raster-based forecast data along the flight path; generating, by the data processing system, a vertical profile for the flight path for all altitudes along the flight path and all flight times along the flight path; converting the weather-related raster-based forecast data into polygonal bands; superimposing, by the data processing system, the polygonal bands onto the vertical profile, resulting in a modified vertical profile; and displaying, by the data processing system, the modified vertical profile with a selector in a graphical user interface (GUI) for selecting a flight time of the flight times along the flight path.

In one example, the flight path may have, for example, a set of geospatial coordinates for each flight time, and the generating includes: building a list of unique X-Y-time entries that correspond to the flight plan; fetching raster tiles as needed from a set of raster tiles for the flight plan based on the list of X-Y-time entries, each raster tile including weather data for a geographical region at a corresponding arrival time; generating weather bands based on altitude ranges and the fetched raster tiles; and displaying the weather bands in the GUI. In one example, the system may further include, for example, a first display area displaying a top-down view of the flight plan overlaid on a map, the top-down view showing the flight plan and weather data that corresponds to the altitude and time that the plane will be at that point; and a second display area having a first axis that correspond to time and a second axis that corresponds to altitude, the second display area displaying a vertical slice view of the weather data at each altitude based on the time that the plane will arrive at that point.

In one example, the displaying in the system of the second aspect may include, for example, displaying, by the data processing system, the modified vertical profile with the selector in a first portion of the GUI. In one example, the system may further include, for example, displaying, by the data processing system, a raster map of the geospatial coordinates with the weather-related raster-based forecast data, resulting in a raster view, in a second portion of the GUI, wherein the raster view is at an altitude and time corresponding to that currently in the first portion of the GUI.

In a third aspect, disclosed above is a computer program product for displaying weather-based information for a flight path, the computer program product includes: a storage medium readable by a processor and storing instructions executable by the processor for performing a method of displaying weather-based information for a flight path. The method includes: receiving, by a data processing system, a flight path; retrieving, by the data processing system, weather-related raster-based forecast data along the flight path; generating, by the data processing system, a vertical profile for the flight path for all altitudes along the flight path and all flight times along the flight path; converting the weather-related raster-based forecast data into polygonal bands; superimposing, by the data processing system, the polygonal bands onto the vertical profile, resulting in a modified vertical profile; and displaying, by the data processing system, the modified vertical profile with a selector in a graphical user interface (GUI) for selecting a flight time of the flight times along the flight path.

In one example, the flight path may have, for example, a set of geospatial coordinates for each flight time, and the generating includes: building a list of unique X-Y-time entries that correspond to the flight plan; fetching raster tiles as needed from a set of raster tiles for the flight plan based on the list of X-Y-time entries, each raster tile including weather data for a geographical region at a corresponding arrival time; generating weather bands based on altitude ranges and the fetched raster tiles; and displaying the weather bands in the GUI. In one example, the method may further include, for example, a first display area displaying a top-down view of the flight plan overlaid on a map, the top-down view showing the flight plan and weather data that corresponds to the altitude and time that the plane will be at that point; and a second display area having a first axis that correspond to time and a second axis that corresponds to altitude, the second display area displaying a vertical slice view of the weather data at each altitude based on the time that the plane will arrive at that point.

In one example, the displaying in the computer program product of the third aspect may include, for example, displaying, by the data processing system, the modified vertical profile with the selector in a first portion of the GUI. In one example, the system may further include, for example, displaying, by the data processing system, a raster map of the geospatial coordinates with the weather-related raster-based forecast data, resulting in a raster view, in a second portion of the GUI, wherein the raster view is at an altitude and time corresponding to that currently in the first portion of the GUI.

Figure 4:
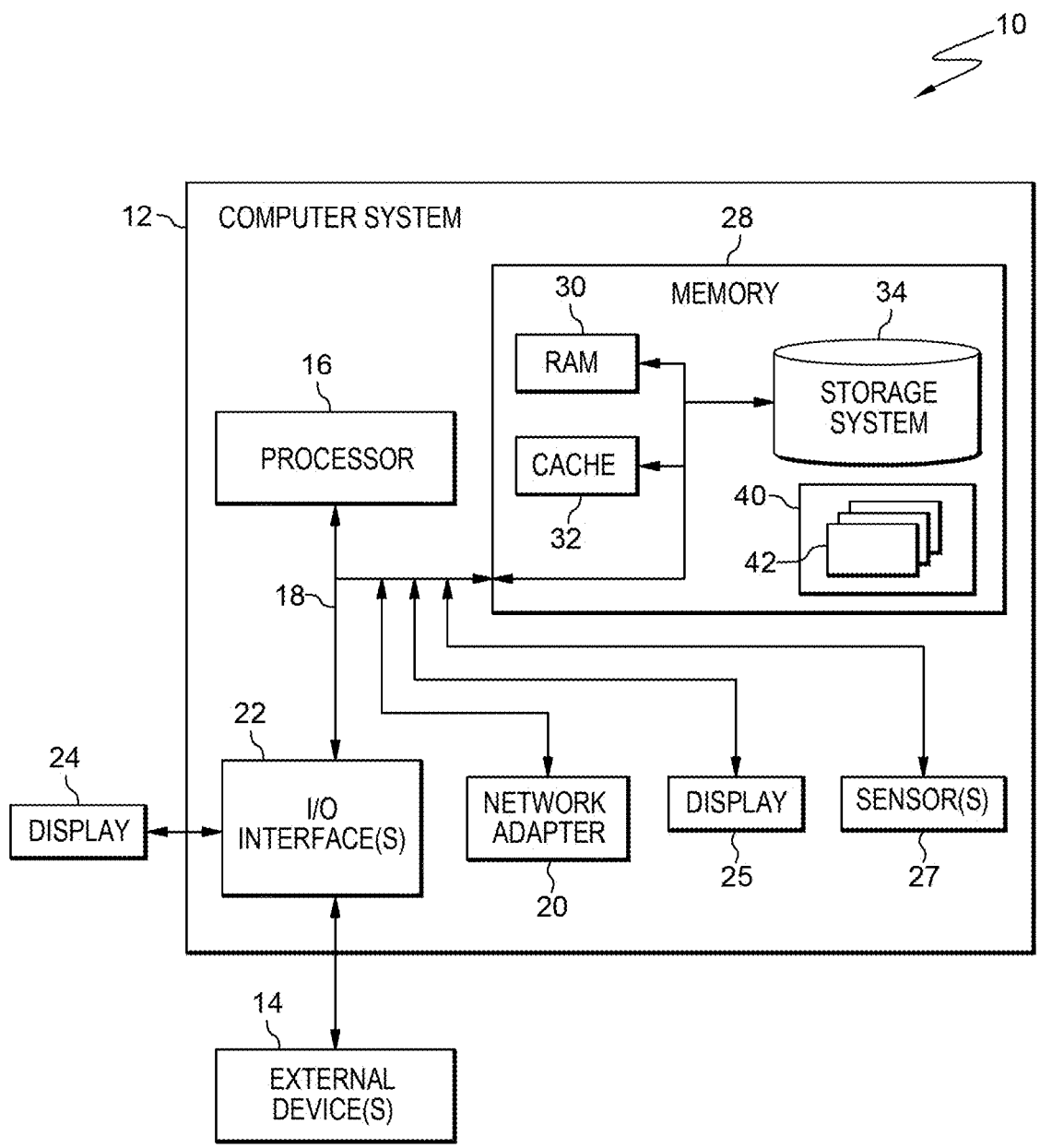
FIG. 4 is a block diagram of one example of a computer system, in accordance with one or more aspects of the present disclosure.
Figure 5:
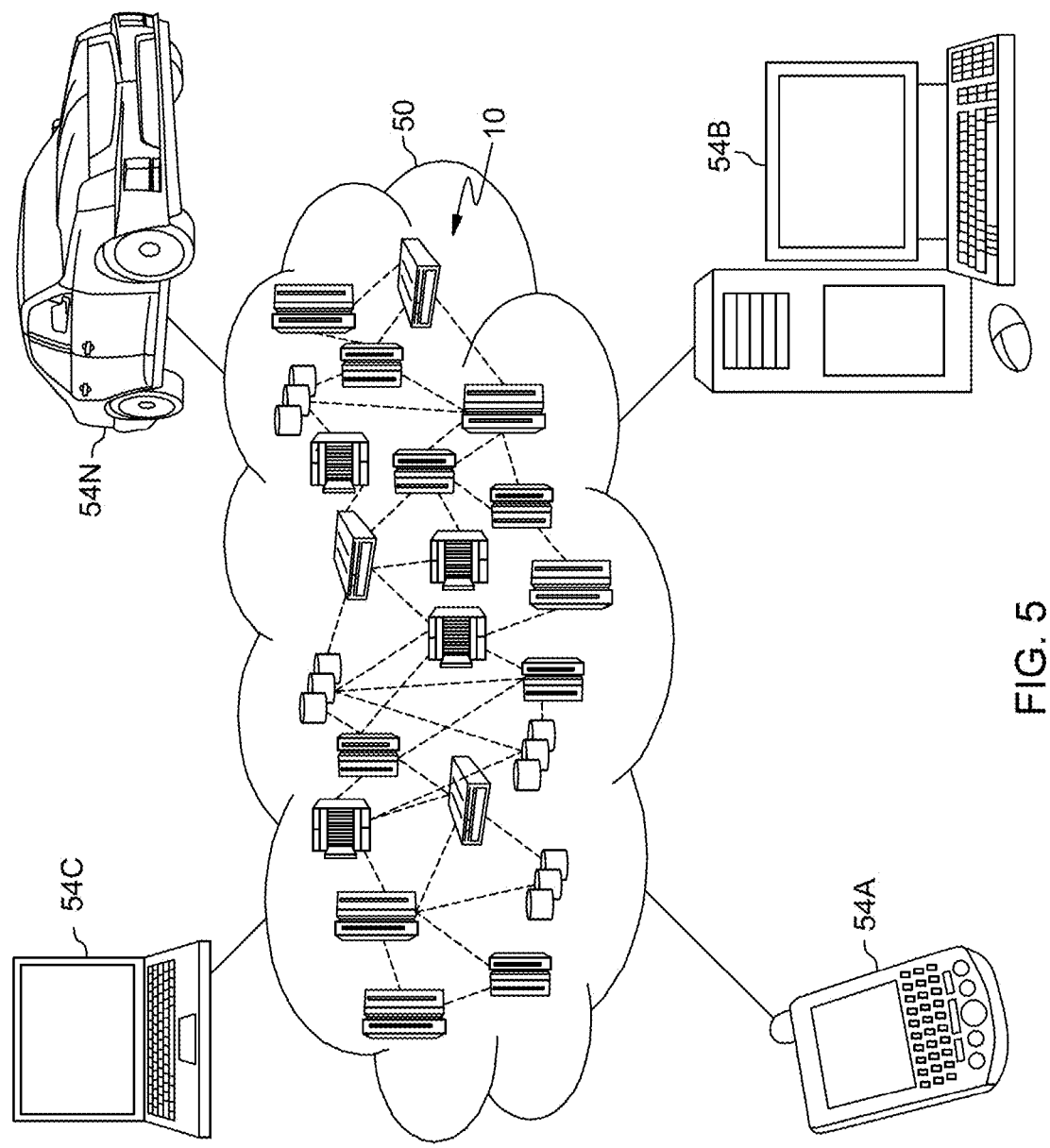
FIG. 5 is a block diagram of one example of a cloud computing environment, in accordance with one or more aspects of the present disclosure.
Figure 6:
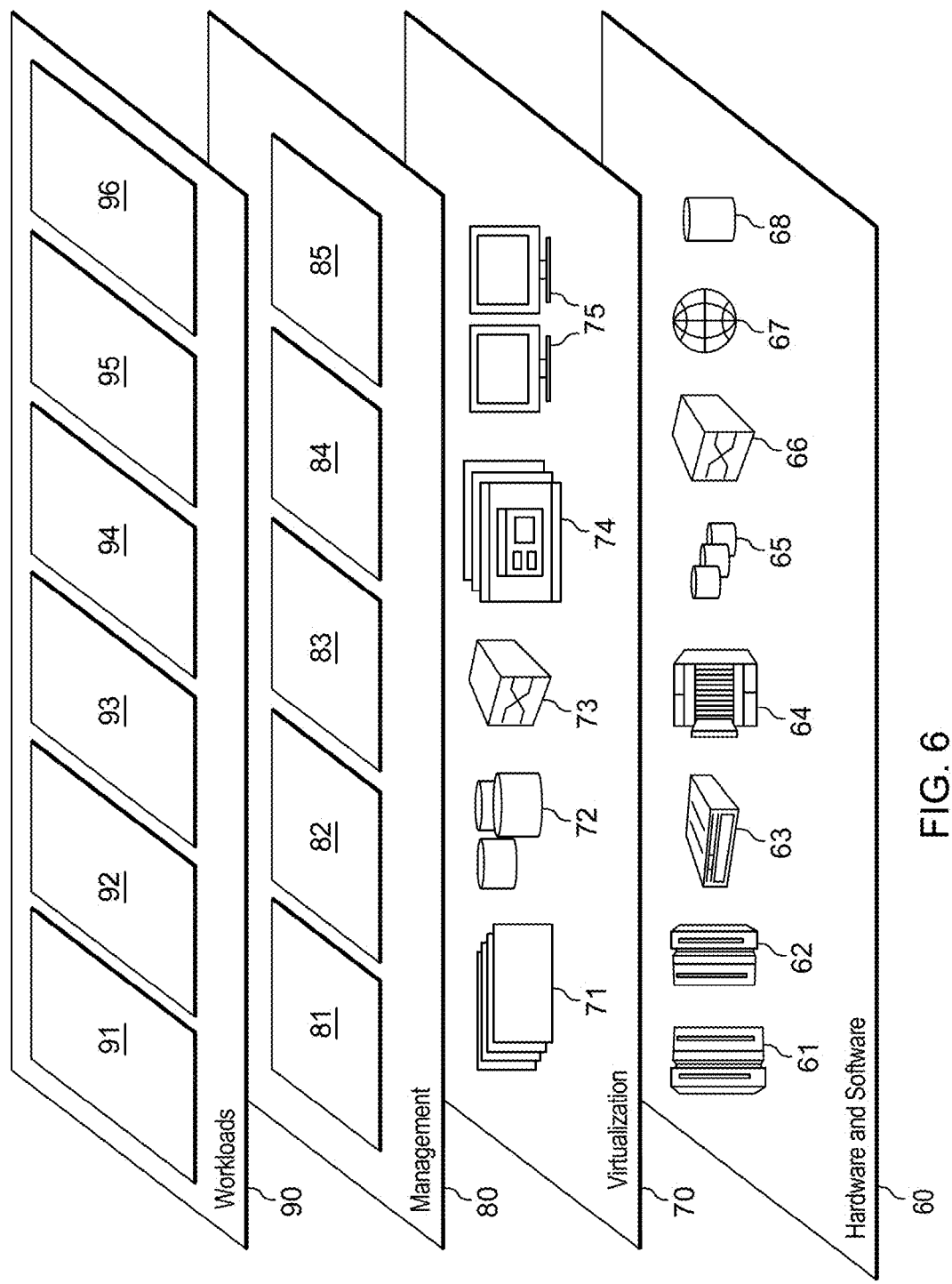
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, one or more client computer device 130A-130Z can include one or more computing node 10 and can include one or more program 40 for performing functions described with reference to one or more client computer device 130A-130Z as set forth in the flowchart of FIG. 4. In one embodiment, administrator client computer device 125 can include one or more computing node 10 and can include one or more program 40 for performing functions described with reference to administrator client computer device 125 as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of displaying weather-based information for a flight path, the computer-implemented method comprising:
   receiving, by a data processing system, a flight path;
   retrieving, by the data processing system, weather-related raster-based forecast data along the flight path;
   generating, by the data processing system, a vertical profile for the flight path for all altitudes along the flight path and all flight times along the flight path;
   converting the weather-related raster-based forecast data into polygonal bands;
   superimposing, by the data processing system, the polygonal bands onto the vertical profile, resulting in a modified vertical profile; and
   displaying, by the data processing system, the modified vertical profile with a selector in a graphical user interface (GUI) for selecting a flight time of the flight times along the flight path, wherein the selector comprises a scrubber for moving along a time axis through the polygonal bands along the flight path in real time and wherein the polygonal bands are parallel with the time axis.

2. The computer-implemented method of claim 1, wherein the flight path has a set of geospatial coordinates for each of the flight times along the flight path, and wherein the generating comprises:
   building a list of unique X-Y-time entries that correspond to the flight path;
   fetching raster tiles as needed from a set of raster tiles for the flight path based on the list of unique X-Y-time entries, each raster tile including weather data for a geographical region at a corresponding arrival time;
   generating a plurality of weather bands based on altitude ranges and the fetched raster tiles; and
   displaying the plurality of weather bands in the GUI.

3. The computer-implemented method of claim 2, wherein the flight path is for an aircraft, the method further comprising:
   a first display area displaying a top-down view of the flight path overlaid on a map, the top-down view showing the flight path and weather data that corresponds to an altitude and time that the aircraft will be at that point; and
   a second display area having a first axis that correspond to time and a second axis that corresponds to altitude, wherein the second display area displays a vertical slice view of the weather data at each altitude based on the time that the aircraft will arrive at that point.

4. The computer-implemented method of claim 1, wherein the displaying comprises displaying, by the data processing system, the modified vertical profile with the selector in a first portion of the GUI.

5. The computer-implemented method of claim 4, further comprising displaying, by the data processing system, a raster map of the set of geospatial coordinates with the weather-related raster-based forecast data, resulting in a raster view, in a second portion of the GUI, wherein the raster view is at an altitude and time corresponding to that currently in the first portion of the GUI.

6. The computer-implemented method of claim 1, wherein the modified vertical profile is based on a plurality of forecast validity periods along the flight path.

7. The computer-implemented method of claim 1, wherein the scrubber comprises a moveable line perpendicular to the time axis.

8. The computer-implemented method of claim 1, wherein the polygonal bands are comprised of a plurality of a base shape grouped together by like areas.

9. The computer-implemented method of claim 1, wherein the weather-related raster-based forecast data comprises turbulence.

10. The computer-implemented method of claim 1, wherein the weather-related raster-based forecast data comprises at least one of severe weather, radar and lightning.

11. A system for displaying weather-based information for a flight path, the system comprising:
    a memory; and
    at least one processor in communication with the memory, the memory storing program code executable by the at least one processor to perform a method, the method comprising:
    receiving, by a data processing system, a flight path;
    retrieving, by the data processing system, weather-related raster-based forecast data along the flight path;
    generating, by the data processing system, a vertical profile for the flight path for all altitudes along the flight path and all flight times along the flight path;
    converting the weather-related raster-based forecast data into polygonal bands;
    superimposing, by the data processing system, the polygonal bands onto the vertical profile, resulting in a modified vertical profile; and
    displaying, by the data processing system, the modified vertical profile with a selector in a graphical user interface (GUI) for selecting a flight time of the flight times along the flight path, wherein the selector comprises a scrubber for moving along a time axis through the polygonal bands along the flight path in real time and wherein the polygonal bands are parallel with the time axis.

12. The system of claim 11, wherein the flight path has a set of geospatial coordinates for each of the flight times along the flight path, and wherein the generating comprises:
    building a list of unique X-Y-time entries that correspond to the flight path;
    fetching raster tiles as needed from a set of raster tiles for the flight path based on the list of unique X-Y-time entries, each raster tile including weather data for a geographical region at a corresponding arrival time;

generating a plurality of weather bands based on altitude ranges and the fetched raster tiles; and displaying the plurality of weather bands in the GUI.

13. The system of claim 12, wherein the flight path is for an aircraft, the method further comprising:
- a first display area displaying a top-down view of the flight path overlaid on a map, the top-down view showing the flight path and weather data that corresponds to an altitude and time that the aircraft will be at that point; and
- a second display area having a first axis that correspond to time and a second axis that corresponds to altitude, wherein the second display area displays a vertical slice view of the weather data at each altitude based on the time that the aircraft will arrive at that point.

14. The system of claim 11, wherein the displaying comprises displaying, by the data processing system, the modified vertical profile with the selector in a first portion of the GUI.

15. The system of claim 14, further comprising displaying, by the data processing system, a raster map of the set of geospatial coordinates with the weather-related raster-based forecast data, resulting in a raster view, in a second portion of the GUI, wherein the raster view is at an altitude and time corresponding to that currently in the first portion of the GUI.

16. A computer program product for displaying weather-based information for a flight path, the computer program product comprising:
- a non-transitory storage medium readable by a processor and storing instructions executable by the processor for performing a method of displaying weather-based information for a flight path, the method comprising:
  receiving, by a data processing system, a flight path;
  retrieving, by the data processing system, weather-related raster-based forecast data along the flight path;
  generating, by the data processing system, a vertical profile for the flight path for all altitudes along the flight path and all flight times along the flight path;
  converting the weather-related raster-based forecast data into polygonal bands;
  superimposing, by the data processing system, the polygonal bands onto the vertical profile, resulting in a modified vertical profile; and
  displaying, by the data processing system, the modified vertical profile with a selector in a graphical user interface (GUI) for selecting a flight time of the flight times along the flight path, wherein the selector comprises a scrubber for moving along a time axis through the polygonal bands along the flight path in real time and wherein the polygonal bands are parallel with the time axis.

17. The computer program product of claim 16, wherein the flight path has a set of geospatial coordinates for each flight time, and wherein the generating comprises:
  building a list of unique X-Y-time entries that correspond to the flight path;
  fetching raster tiles as needed from a set of raster tiles for the flight path based on the list of unique X-Y-time entries, each raster tile including weather data for a geographical region at a corresponding arrival time;
  generating a plurality of weather bands based on altitude ranges and the fetched raster tiles; and
  displaying the plurality of weather bands in the GUI.

18. The computer program product of claim 17, wherein the flight path is for an aircraft, the method further comprising:
- a first display area displaying a top-down view of the flight path overlaid on a map, the top-down view showing the flight path and weather data that corresponds to an altitude and time that the aircraft will be at that point; and
- a second display area having a first axis that correspond to time and a second axis that corresponds to altitude, wherein the second display area displays a vertical slice view of the weather data at each altitude based on the time that the aircraft will arrive at that point.

19. The computer program product of claim 16, wherein the displaying comprises displaying, by the data processing system, the modified vertical profile with the selector in a first portion of the GUI.

20. The computer program product of claim 19, further comprising displaying, by the data processing system, a raster map of the set of geospatial coordinates with the weather-related raster-based forecast data, resulting in a raster view, in a second portion of the GUI, wherein the raster view is at an altitude and time corresponding to that currently in the first portion of the GUI.

* * * * *